United States Patent
Nauflett et al.

(10) Patent No.: US 7,150,855 B1
(45) Date of Patent: Dec. 19, 2006

(54) PELLETIZED NITROCELLULOSE (PNC) MANUFACTURE AND LONG TERM STORAGE

(75) Inventors: George W. Nauflett, Ft. Washington, MD (US); Robert E. Farncomb, Accokeek, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/216,894

(22) Filed: Aug. 31, 2005

Related U.S. Application Data

(62) Division of application No. 10/263,289, filed on Oct. 2, 2002.

(51) Int. Cl.
*B01J 19/00* (2006.01)
*C06B 31/00* (2006.01)

(52) U.S. Cl. .............. 422/40; 149/17; 149/45; 422/1; 588/249

(58) Field of Classification Search .......... 422/1, 422/40; 149/17, 45; 588/249
See application file for complete search history.

(56) References Cited

U.S. PATENT DOCUMENTS

| | | | |
|---|---|---|---|
| 3,671,515 A | 6/1972 | Cox et al. | |
| 3,702,353 A | 11/1972 | Henderson et al. | |
| 3,723,207 A | 3/1973 | Camp et al. | |
| 3,873,517 A | 3/1975 | Liggett et al. | |
| 3,926,697 A * | 12/1975 | Humbert et al. | 149/14 |
| 3,962,382 A | 6/1976 | Johnson et al. | |
| 4,369,689 A * | 1/1983 | Donaghue et al. | 86/20.15 |
| 4,590,019 A | 5/1986 | Luhmann et al. | |
| 4,670,200 A * | 6/1987 | Helle | 264/3.3 |
| 5,144,020 A | 9/1992 | Fung | |
| 6,490,958 B1 * | 12/2002 | Charest et al. | 89/45 |
| 6,692,655 B1 * | 2/2004 | Martins et al. | 149/19.5 |

OTHER PUBLICATIONS

Derwent Abstracted Pub. No. DE2005004116U.*

* cited by examiner

*Primary Examiner*—Krisanne Jastrzab
(74) *Attorney, Agent, or Firm*—Fredric J. Zimmerman

(57) ABSTRACT

A method of making pelletized nitrocellulose (PNC) includes preparing a lacquer, the lacquer comprising nitrocellulose (NC), ethyl acetate and ethyl centralite, the NC having a nitrogen content of at least about 12.2%; mixing the lacquer with an antisolvent to thereby emulsify the lacquer and form PNC; drowning the PNC with the antisolvent; and separating the antisolvent and ethyl acetate from the PNC.

9 Claims, 4 Drawing Sheets

PELLETIZED NITROCELLULOSE (PNC) MANUFACTURE AND LONG TERM STORAGE

The present Application is a Divisional Application of U.S. patent application Ser. No. 10/263,289 filed on Oct. 2, 2002.

STATEMENT OF GOVERNMENT INTEREST

The invention described herein may be manufactured and used by or for the Government of the United States of America for government purposes without the payment of any royalties therefor.

BACKGROUND OF THE INVENTION

The invention relates in general to a method for preparing pelletized nitrocellulose (PNC), and more particularly to an environmentally friendly method of preparing PNC.

The nitrocellulose (NC) most commonly used by the inventors to prepare PNC (Plastisolor Pelletized Nitrocellulose) is Grade A, Type 1, and has 12.6±0.1% nitrogen content. The NC is prepared from cotton linters and is fibrous in shape. Dry, military grade nitrocellulose is hydroscopic and will absorb between 1 to 3% water when exposed to atmospheres high in relative high humidity. Dry NC is sensitive to impact, friction, spark, and heat. It is much less sensitive when wet with liquids such as alcohol, heptane, petroleum ether, or water.

Water wet NC is classified as a flammable solid by DOT. The transportation of dry NC is not permitted. The preparation of PNC involves changing the fibrous NC into tiny balls (10 to 20 µm) or spheres. Safety is a major concern in the manufacture of PNC. PNC is a mass-detonating explosive when it is dry. This means it can explode instantly when even a small portion is exposed to fire, impact, or electrical spark. Technically it is classed as a "Group 1 Explosive, Class 1, Division 1, DOT Class A". When PNC is wet with 20% or more water, it is officially classed as a flammable solid, but is very difficult to burn. When PNC is wet with a solvent (for example, alcohol, water or heptane) it is officially classed as a flammable liquid. Solvent wet PNC will burn like the solvent alone.

PNC has been manufactured since the 1950's. Over time a continuous pelletized nitrocellulose (PNC) process was developed and patented. U.S. Pat. Nos. 5,144,020 and 4,590,019 deal with the use of commercial nitrocellulose (NC) and use alcohol-water-organic solvents to produce lacquers. There are three types of commercial NC: RS (11.8 to 12.2% N); SS (spirit-soluble 10.9 to 11.2% N); and AS (11.3 to 11.7% N). RS is soluble in ether/alcohol; SS and AS are alcohol-soluble. The type of NC used in the present invention is military grade (12.2 to 13.8% N). Military grade NC is not soluble in alcohol.

U.S. Pat. Nos. 3,671,515; 3,702,353 and 3,873,517 deal with the preparation of PNC. These patents disclose a process for preparation of a nitromethane/PNC-water emulsion. FIG. 1 is a diagram of a prior art PNC manufacturing process. The prior process includes: 1. Lacquer Preparation; 2. Emulsification; 3. Drowning; 4. Solvent Removal; 5. Product Removal; and 6. Solvent Purification

1. Lacquer Preparation

The lacquer is heated to 140° F. (60° C.). Before opening the lacquer makeup tank, the lacquer tank vent is turned on to draw off the nitromethane fumes. The lacquer is agitated until all the lumps of NC are dissolved, and then diluted to its final concentration. The lacquer is transferred to the lacquer feed tank via the lacquer transfer pump. The lacquer transfer pump should have its discharge valve open at all times to prevent any pressure buildup. Past experience has shown that high nitromethane water content will cause cure, viscosity and particle size problems. This has only been noted when the lacquer has a milky appearance (all water is not dissolved). The nitrocellulose content of the lacquer has been varied in the past and shown to have no impact on cure quality.

2. Emulsification

PNC is formed when the NC/nitromethane lacquer stream is mixed with a water stream and violent agitation in a colloid mill. This forms an emulsion, which is small droplets of the lacquer surrounded by water. This emulsion is next mixed with a large amount of water. This is called "drowning". The water extracts all the nitromethane solvent from the lacquer droplets leaving the small spherical PNC particles. The lacquer feed rate has been shown to have some effect on the PNC cure quality if it is above a production rate of 40 lbs/hr per emulsification system. The lacquer feed temperature varies between 130° F. and 155° F. (54° C. and 68° C.) due to equipment and control system limitations. The lacquer rate has tended to vary with temperature fluctuations of the lacquer. There is no correlation between lacquer temperature and cure quality. Drown water and emulsification water temperature have been well controlled along with the emulsification water and drown water rates. There is no indication of any correlation between these rates and temperature and cure quality. These rates have been varied extensively without affecting the cure quality.

3. Drowning

The next step is to remove the nitromethane in the drowned emulsion. The drowned emulsion is pumped to the drown column where it is heated from about 120° F. to 150° F. (49° to 66° C.) by the drown column preheater. The drown column must always operate at less than 300 mm Hg pressure. This is to keep the PNC at less than 175° F. (79° C.). If PNC is kept at temperatures above 175° F. (79° C.) it will start to degrade. It will not degrade at rapid rates until it is heated above 205° F. (96° C.). For safety, a limit of 175° F. (79° C.) has been set for normal operations.

4. Solvent Removal

Upon entering the drown column, the nitromethane is boiled away. (This is called "stripping" the feed to the column of nitromethane) The PNC/water flows to the bottom of the column where it is circulated through the drown column reboiler. The reboiler provides the heat for stripping off the remainder of the nitromethane. The nitromethane and water vapor coming off the top of the column are condensed and pumped to a decanter where the water is allowed to separate. The nitromethane is then pumped from the decanter to the nitromethane column. In the nitromethane column, the last of the water is stripped from the nitromethane and pumped back to the decanter, while the purified nitromethane is pumped from the bottom of the column to the nitromethane storage tank.

5. Product Removal

The PNC/water slurry is pumped from the bottom of the drown column to the clarifier to concentrate the slurry. The concentrated slurry is then fed to a centrifuge to separate the water from the PNC. The PNC is discharged from one end and is collected in a conductive plastic bag. The bag is usually changed every half hour, and should never be allowed to collect more than 50 pounds. When starting the clairifier or centrifuge, always wet down first to desensitize any dry PNC that may have accumulated. The PNC/water slurry is fed directly from the clairifier to the vapor body though a spray nozzle. A hot stream of PNC/heptane is recirculated through the vapor body surge tank to boil off the water. A large amount of heptane is also vaporized along with the water. The liquid heptane/PNC overflows from the vapor body to the surge tank where the vapor goes out the top to the heptane recovery system.

6. Solvent Purification

The nitromethane purification process is used to remove water from the wet nitromethane layer. The wet nitromethane normally contains between 2% and 4% water by weight. The dry nitromethane normally contains less than 0.05% water by weight. Since water wet nitrocellulose added in the lacquer preparation area raises the water content of the lacquer to 2.2%, small variations in the nitromethane water content do not have a significant effect on the overall water content of the lacquer. The water content of the nitromethane is not regularly analyzed; however, by monitoring the temperature difference between the upper middle of the column and the column bottom temperature, an indication of the moisture content of the nitromethane can be determined. As long as the bottom temperature is above 145° F. and the temperature difference is less than 25°–30° F., the moisture content is too low to have any impact on the lacquer moisture content. There also may be other impurities in the nitromethane, which may have an impact on the cure. This impurity could be removed by increased boil-up in the column. However, a review of the data does not indicate any correlation between the nitromethane purification operation and the cure of PNC.

7. Tray Drying

PNC is dried by granulating it if necessary and spreading it on trays. Generally all water wet PNC must be granulated prior to spreading. After the PNC is spread, the trays are put into carts and the carts are placed in an oven at 130° F. (54° C.) for up to 9 days. In general, water wet PNC is dried for 7 days until the moisture is less than 0.5% by weight. Heptane wet PNC is dried for 4 days.

Two major disadvantages of the above-described prior process are the use of nitromethane, which is toxic, and the high temperatures used in the drying process. The present invention eliminates the use of nitromethane and the high temperatures used for drying, thereby resulting in a safer, more environmentally friendly process. Further objects, features, and advantages of the invention will become apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE PREFERRED EMBODIMENTS

The present invention is a safe, environmentally friendly process for the preparation of pelletized nitrocellulose (PNC). The invention eliminates the use of toxic nitromethane by substituting ethyl acetate. The preparation of PNC in the present invention can be performed at low temperatures. Organic solvents (for example, heptane; alcohols) as well as water can be used to prepare the PNC emulsion. Water wet or solvent wet PNC is processed at lower temperatures. The new process eliminates the labor intensive and unsafe tray drying of PNC.

Figure 1:
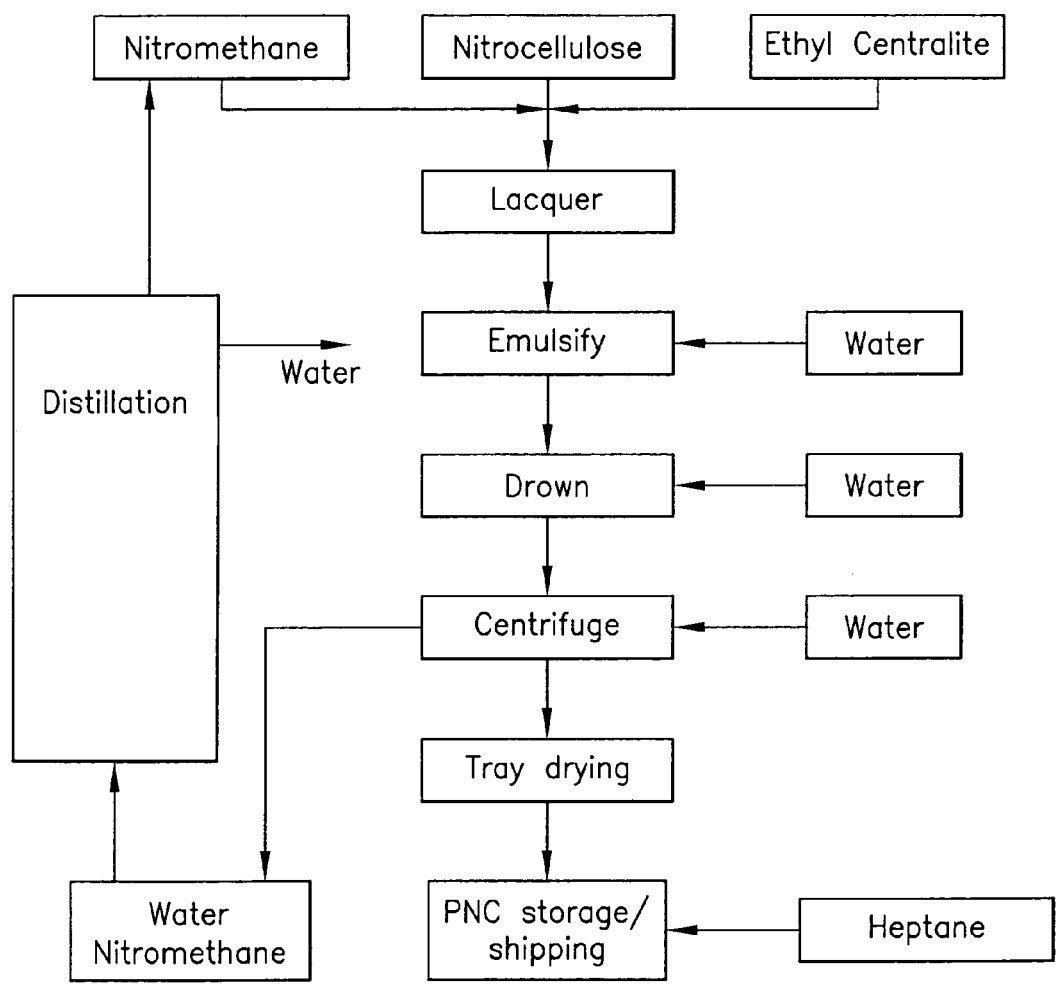
FIG. 1 is a diagram of a prior art PNC manufacturing process.
Figure 2:
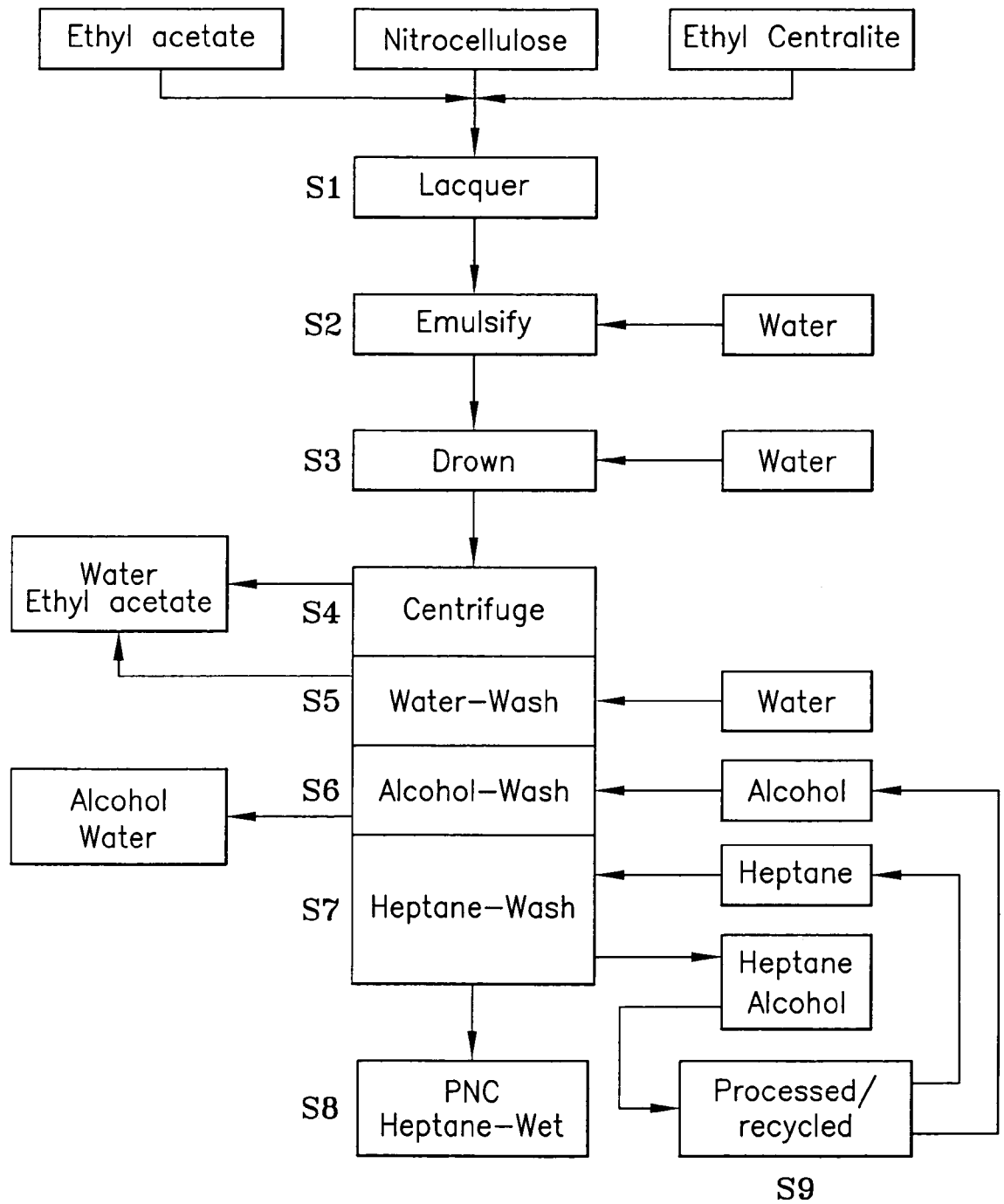
FIG. 2 is a diagram of one embodiment of a PNC manufacturing process according to the invention.
Figure 3:
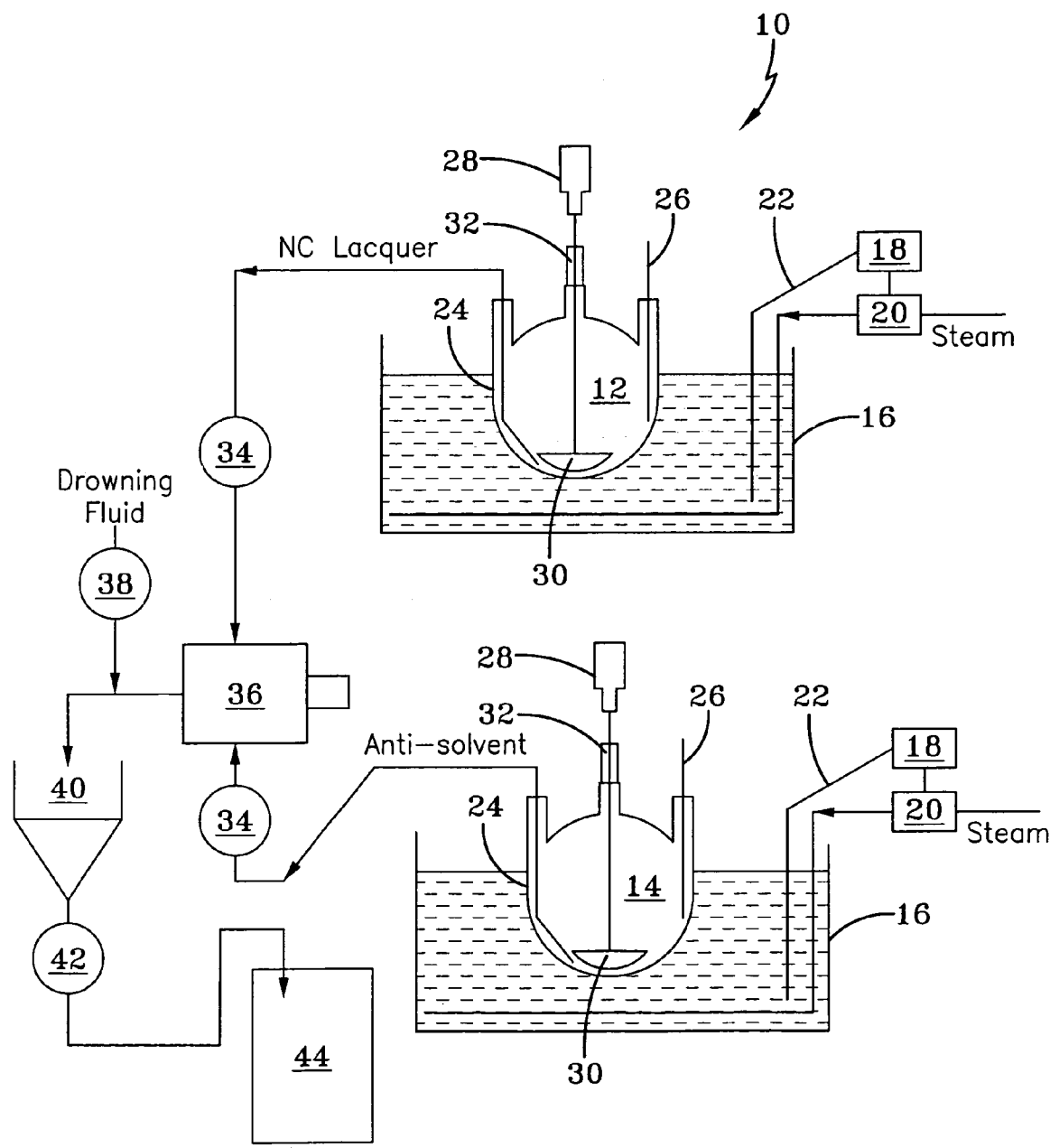
FIG. 3 shows laboratory apparatus for preparing PNC.

FIG. 2 is a diagram of one embodiment of a PNC manufacturing process according to the invention. Stated broadly, the invention includes the steps of lacquer preparation; emulsification and drowning; filtering/centrifuging; and slurrying the PNC in heptane, water or alcohol.

Referring to FIG. 2, in step S1, the lacquer is prepared by mixing together nitrocellulose (NC), ethyl acetate and ethyl centralite. The NC has a nitrogen content of at least about 12.2%.

Preferably, the lacquer comprises about 95.2% ethyl acetate, 4.31% NC, 0.48% water and 0.01% ethyl centralite.

In step S2, the lacquer is combined with an antisolvent to thereby emulsify the lacquer and form PNC. While FIG. 2 shows water as the antisolvent, heptane may also be used. In step S3, the PNC is drowned with the antisolvent. Again, while FIG. 2 shows water as the drowning fluid, heptane may also be used. In step S4, the antisolvent and ethyl acetate are separated from the PNC by centrifuging and/or filtering. In step S5, the PNC is water washed to further remove the ethyl acetate. In step S6, the PNC is alcohol washed to remove the water. In step S7, the PNC is heptane washed to remove the alcohol. In step S8, the PNC is slurried in heptane.

If heptane is used as the antisolvent in steps S2 and S3, then steps S5 and S6 may be eliminated. Similarly, if water is used as the antisolvent in steps S2 and S3, and the end product desired is water wet PNC, then steps S6 and S7 may be eliminated. FIG. 2 also shows a step S9 which is a recycle loop to recover heptane and alcohol.

EXAMPLE 1

The NC lacquer 12 and anti-solvent 14 were prepared in temperature controlled baths 16. Temperature controllers 18 and steam solenoid valves 20 control the temperature of the baths. Temperature controllers 18 receive bath temperature information via thermocouples 22. Three-neck two-liter flasks 24 are immersed in the baths. One neck of the flasks 24 receive thermocouples 26. Air motors 28 with agitators 30 and bearings 32 provide mixing action.

The lacquer was prepared by mixing 54.6 grams of NC (12.6% N lot ARV01F601-100) containing 10% water (49% NC) with 1 gram of ethyl centralite (EC) and 1080 grams of ethyl acetate. The resulting mixture was 95.2% ethyl acetate (EA), 4.31% nitrocellulose (NC), 0.48% water, and 0.01% ethyl centralite (EC). The lacquer was mixed for an hour, let stand overnight and mixed for another hour.

Anitsolvent (heptane) 14 and the lacquer 12 were heated to 55° C. and pumped by pumps 34 at 50 mL/minute into an inline laboratory homogenizer 36. The emulsion exiting the homogenizer was drowned with a flow of 350 mL/min of heptane using pump 38. The mixture was then filtered by filter 40 and pumped by pump 42 into filtrate receiver 44. The resulting PNC had a particle size of 1 to 20 µm and contained 2% ethyl centralite (EC). The heptane/PNC mixture filtered fast. The PNC prepared contained small particles, short fibers and fines (>0.5 µm).

EXAMPLE 2

The procedure is the same as Example 1 except water was used as the antisolvent. The resulting PNC had a particle size of 1 to 20 μm and contained 2% ethyl centralite (EC). The PNC/water mixture filtered very slow. The PNC prepared contained small particles, short fibers and fines (>0.5 μm).

Long Term Storage of PNC in Heptane

Figure 4:
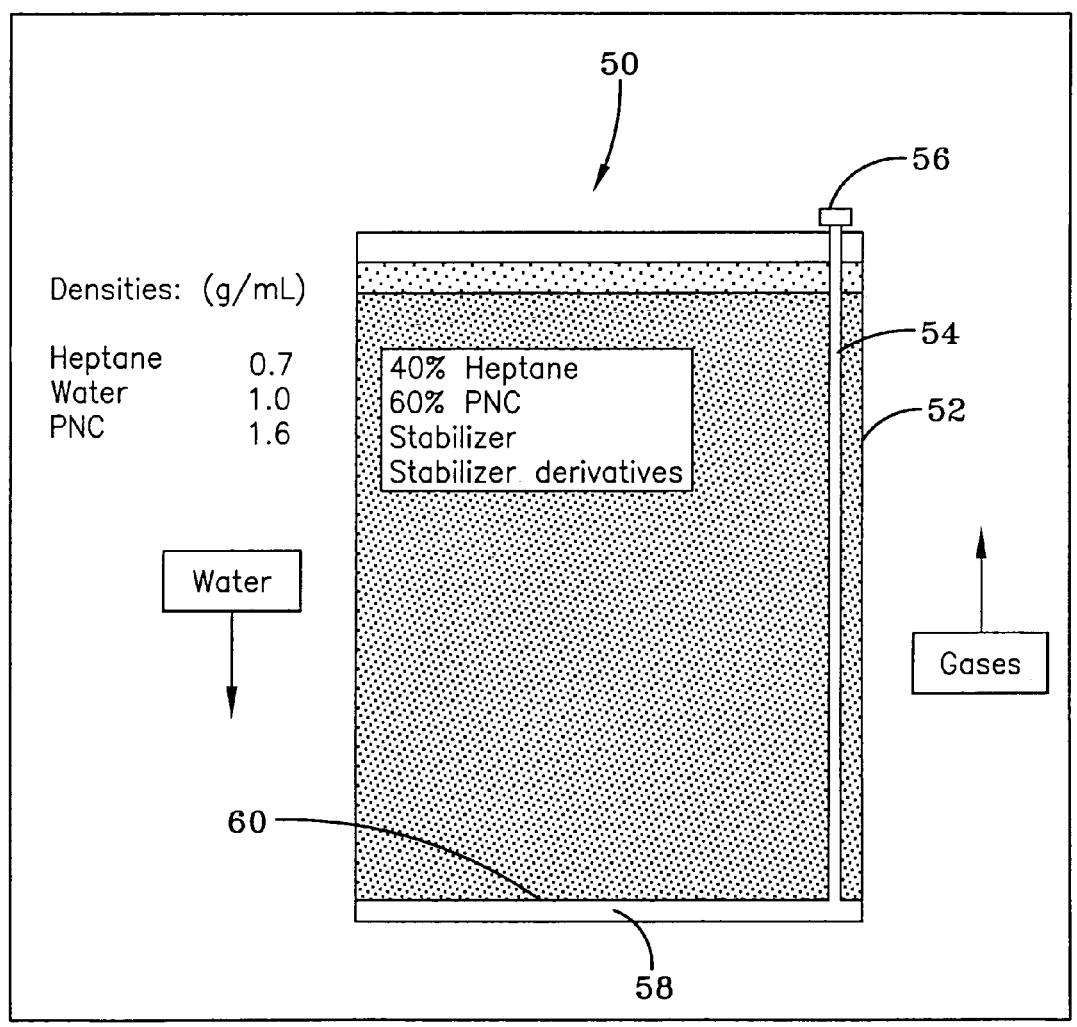
FIG. 4 shows an apparatus for long term storage of PNC in heptane.

Shown in FIG. 4 is an apparatus 50 for long term storage of PNC in heptane. The apparatus 50 includes a drum 52 having a top cover, a tube 54 with cap 56, a floor mat 58 and filter cloth 60 placed over the floor mat 58. Tube 54 extends from the floor mat 58 through the cover of the drum 52. The floor mat may be made of PVC, high density polyethylene or conductive materials compatible with NC and heptane.

The densities of heptane, water, and PNC are: 0.7, 1.0, and 1.6 g/mL respectively. The water and PNC slowly settle to the bottom of the storage drum 52 as shown in FIG. 4. Heptane vapor collects at the top of the drum. The mesh of the filter cloth 60 is chosen so that water will flow through but not PNC. As trace amounts of water collect at the bottom of the drum, the water can be removed at any time using the tube 54. Stabilizer may also be added to the drum.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A method of storing heptane wet pelletized nitrocellulose, comprising:

providing a drum comprising a cover, a floor mat being located in a bottom portion of said drum, a filter cloth on top of said floor mat, a tube comprising a first end at said bottom portion and a second end outside said drum, and a cap on said tube;

filling said drum with heptane wet pelletized nitrocellulose and leaving a space at a top portion of said drum for heptane vapor; and collecting water from said bottom portion of said drum by removing said cap from said tube and applying suction to said tube to remove said water.

2. The method of according to claim 1, wherein said floor mat is selected from polyvinyl chloride, high density polyethylene and a conductive material compatible with nitrocellulose and said heptane.

3. The method according to claim 1, wherein said filter cloth comprises a mesh, and wherein water is passed through said mesh but said mesh retains said heptane wet pelletized nitrocellulose.

4. The method according to claim 1, further comprising adding stabilizer compounds to said heptane wet pelletized nitrocellulose in said drum.

5. The method according to claim 1, wherein said heptane wet pelletized nitrocellulose is comprised of 40 percent heptane and 60 percent pelletized nitrocellulose.

6. The method according to claim 1, wherein said drum comprises an inner portion, said inner portion includes said heptane vapor layered on top of said heptane wet pelletized nitrocellulose, and said heptane wet pelletized nitrocellulose is layered on top of said water.

7. The method according to claim 1, wherein said top portion of said drum is located substantially adjacent said cap.

8. The method according to claim 3, wherein said pelletized nitrocellulose is located between said mesh and said top portion of said drum.

9. The method according to claim 3, wherein said water is located between said mesh and said bottom portion.

* * * * *